United States Patent
Yamakawa et al.

(10) Patent No.: US 9,609,196 B2
(45) Date of Patent: Mar. 28, 2017

(54) IMAGING MODULE AND ELECTRONIC DEVICE

(71) Applicant: FUJIFILM Corporation, Tokyo (JP)

(72) Inventors: Kenji Yamakawa, Saitama (JP); Yukihiro Kaneko, Saitama (JP); Manabu Tobise, Saitama (JP); Tatsuya Fujinami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/996,745

(22) Filed: Jan. 15, 2016

(65) Prior Publication Data

US 2016/0134795 A1 May 12, 2016

Related U.S. Application Data

(63) Continuation of application No. PCT/JP2014/068061, filed on Jul. 7, 2014.

(30) Foreign Application Priority Data

Jul. 30, 2013 (JP) ................................. 2013-157721

(51) Int. Cl.
  *H04N 5/232* (2006.01)
  *H04N 5/225* (2006.01)
  *G02B 7/08* (2006.01)
  *G03B 5/00* (2006.01)
  *G03B 3/10* (2006.01)

(52) U.S. Cl.
  CPC ............. *H04N 5/2257* (2013.01); *G02B 7/08* (2013.01); *G03B 3/10* (2013.01); *G03B 5/00* (2013.01); *H04N 5/2253* (2013.01); *G03B 2205/0069* (2013.01)

(58) Field of Classification Search
  CPC .................................................. H04N 5/2253
  See application file for complete search history.

(56) References Cited

U.S. PATENT DOCUMENTS

2009/0180021 A1 7/2009 Kikuchi et al.
2010/0085474 A1 4/2010 Morita
2011/0286732 A1 11/2011 Hosokawa et al.

FOREIGN PATENT DOCUMENTS

| JP | 2010-21985 A | 1/2010 |
| JP | 2010-88088 A | 4/2010 |
| JP | 2011-247909 A | 12/2011 |

OTHER PUBLICATIONS

English translation of an International Preliminary Report, dated Feb. 2, 2016 for counterpart PCT Application No. PCT/JP2014/068061.

(Continued)

*Primary Examiner* — Gary C Vieaux
(74) *Attorney, Agent, or Firm* — Birch Stewart Kolasch & Birch, LLP

(57) ABSTRACT

An imaging module 100 includes a lens unit 10 and an imaging element unit 20. The lens unit 10 includes a VCM 16A which moves a lens group 12 in a z direction, terminals 14A and 14B which are electrically connected to the VCM 16A, a VCM 16C and a VCM 16E which move the lens group 12 in an x direction and a y direction, and terminals 14C to 14F which are electrically connected to the VCM 16C and the VCM 16E. The imaging element unit 20 includes terminals 24A to 24F which are electrically connected to the terminals 14A to 14F. Exposed areas of the terminals 14A and 14B are larger than exposed areas of the terminals 14C to 14F.

20 Claims, 9 Drawing Sheets

(56) References Cited

OTHER PUBLICATIONS

English translation of the Written Opinion dated Sep. 22, 2014,for counterpart PCT Application No. PCT/JP2014/068061.
International Search Report for PCT/JP2014/068061 dated Sep. 22, 2014.
Written Opinion of the International Searching Authority for PCT/JP2014/068061 dated Sep. 22, 2014.

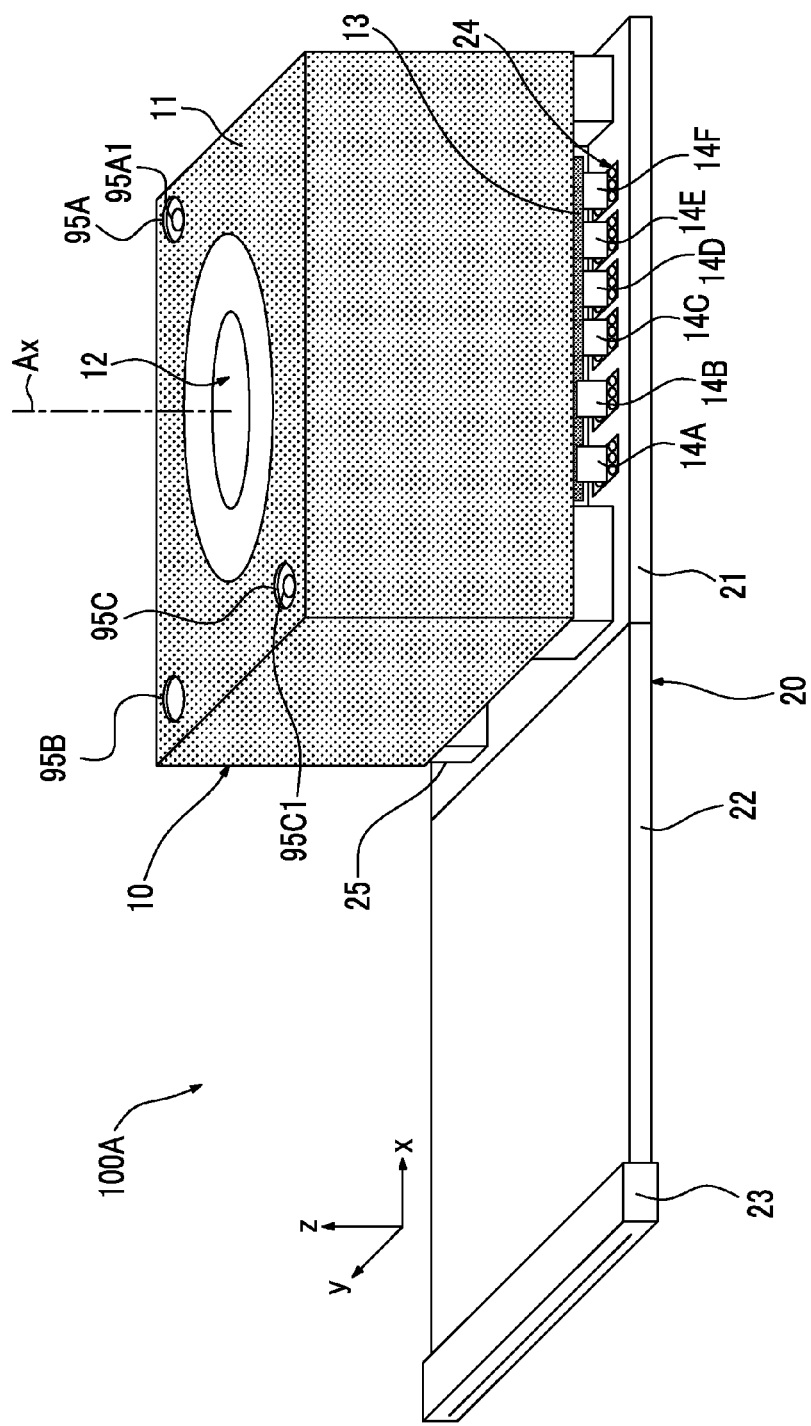

IMAGING MODULE AND ELECTRONIC DEVICE

CROSS-REFERENCE TO RELATED APPLICATIONS

This application is a Continuation of PCT International Application No. PCT/JP2014/068061 filed on Jul. 7, 2014, which claims priority under 35 U.S.C §119 (a) to Japanese Patent Application No. 2013-157721 filed on Jul. 30, 2013. Each of the above application(s) is hereby expressly incorporated by reference, in its entirety, into the present application.

BACKGROUND OF THE INVENTION

1. Field of the Invention

The present invention relates to an imaging module and an electronic device having the imaging module.

2. Description of the Related Art

A small and thin imaging module is mounted on a portable electronic device such as a portable phone having a photographing function. The imaging module has a structure in which a lens unit in which a photographic lens is incorporated and an imaging element unit in which a Charge Coupled Device (CCD) image sensor, a Complementary Metal-Oxide Semiconductor (CMOS) image sensor, or the like is incorporated are integrated with each other.

As the imaging module, there is an imaging module which has an auto focus (AF) mechanism which moves a lens in the lens unit for performing focus adjustment, and an imaging module which has an optical type image blur correction mechanism which relatively moves the lens unit and the imaging element unit in a direction orthogonal to an optical axis for optically correcting blur of a captured image.

For example, JP2010-21985A and JP2010-88088A disclose the imaging module having the AF mechanism, and JP2011-247909A discloses the imaging module having the AF mechanism and the optical type image blur correction mechanism.

In recent years, as an imaging element which is used in an imaging module, instead of an imaging element having a low pixel number such as approximately one million pixels to two million pixels, an image element having a high pixel number such as three million pixels to ten million pixels or more is widely used.

When the imaging element of a low pixel number is used, particularly, high accuracy is not required for positioning of the lens unit and the imaging element unit. However, when the imaging element having a high pixel number is used, high accuracy is required for the positioning.

In JP2010-21985A and JP2010-88088A, a technology is disclosed in which positioning of a lens unit and an imaging element unit and fixation between the lens unit and the imaging element unit are automatically performed.

In this technology, after the lens unit and the imaging element unit are set to an initial position, a measurement chart is captured by the imaging element while the imaging element unit moves in an optical axis direction, and the positions of the lens unit and the imaging element unit are adjusted from the obtained captured image. After the adjustment, the lens unit and the imaging element unit are bonded and fixed to each other.

SUMMARY OF THE INVENTION

In the imaging module having the AF mechanism and the optical type image blur correction mechanism, for example, the imaging element unit and the lens unit can relatively move in three directions orthogonal to one another. Accordingly, in a process of adjusting the position of the lens unit and the imaging element units, the lens in the lens unit is affected by gravity and moves in the gravity direction.

By performing positioning of the lens unit and the imaging element unit in a state where the position of the lens moved by gravity is held at a predetermined position, it is possible to accurately perform the positioning.

However, in order to adjust the position of the lens, for example, it is necessary to input drive signals by allowing a probe pin to come into contact with a terminal which is provided in the lens unit to drive the lens.

According to a decrease in a size of the lens unit, since a size of the terminal also decreases, it is necessary to perform positioning of the terminal and the probe pin with high accuracy. However, in order to position the terminal and the probe pin with high accuracy, high cost in a manufacturing apparatus of the imaging module, or complication in a manufacturing method of the imaging module occurs, and a manufacturing cost of the imaging module increases.

The present invention is made in consideration of the above-described circumstances, and an object thereof is to provide an imaging module capable of performing positioning of the imaging element unit and the lens unit at a low cost and with high accuracy, and an electronic device having the imaging module.

An imaging module of the present invention includes a lens unit which includes a lens group, and an imaging element unit which is fixed to the lens unit and includes an imaging element which captures a photographic subject through the lens group. The lens unit includes a first lens driving unit which moves at least a portion of lenses of the lens group along an optical axis of the lens group, a plurality of first connection portions which are electrically connected to the first lens driving unit, a second lens driving unit and a third lens driving unit which move at least a portion of the lenses in a second direction and a third direction orthogonal to the optical axis of the lens group, respectively, a plurality of second connection portions which are electrically connected to the second lens driving unit, a plurality of third connection portions which are electrically connected to the third lens driving unit, and a housing in which at least the first lens driving unit, the second lens driving unit, and the third lens driving unit are accommodated. The imaging element unit includes a fourth connection portion which is electrically connected to each of the plurality of first connection portions, the plurality of second connection portions, and the plurality of third connection portions. Each connection portion of the plurality of first connection portions, the plurality of second connection portions, and the plurality of third connection portions includes an exposed surface which is exposed outside the housing. Each of the plurality of first connection portions, the plurality of second connection portions, and the plurality of third connection portions has a connection portion in which the exposed surface has a first area, and a connection portion in which the exposed surface has a second area which is larger than the first area. The exposed surface of at least one connection portion of the plurality of first connection portions has the second area. The exposed surface of each connection portion of the plurality of second connection portions and the plurality of third connection portions has the first area.

An electronic device of the present invention includes the imaging module.

According to the present invention, it is possible to provide an image module capable of performing positioning of the imaging element unit and the lens unit at a low cost and with high accuracy, and the electronic device having the imaging module.

BRIEF DESCRIPTION OF THE DRAWINGS

FIG. 9 is an external perspective view of an imaging module 100A which is a modification example of the imaging module 100 shown in FIG. 1.

DESCRIPTION OF THE PREFERRED EMBODIMENTS

Hereinafter, embodiments of the present invention will be described with reference to the drawings.

Figure 1:
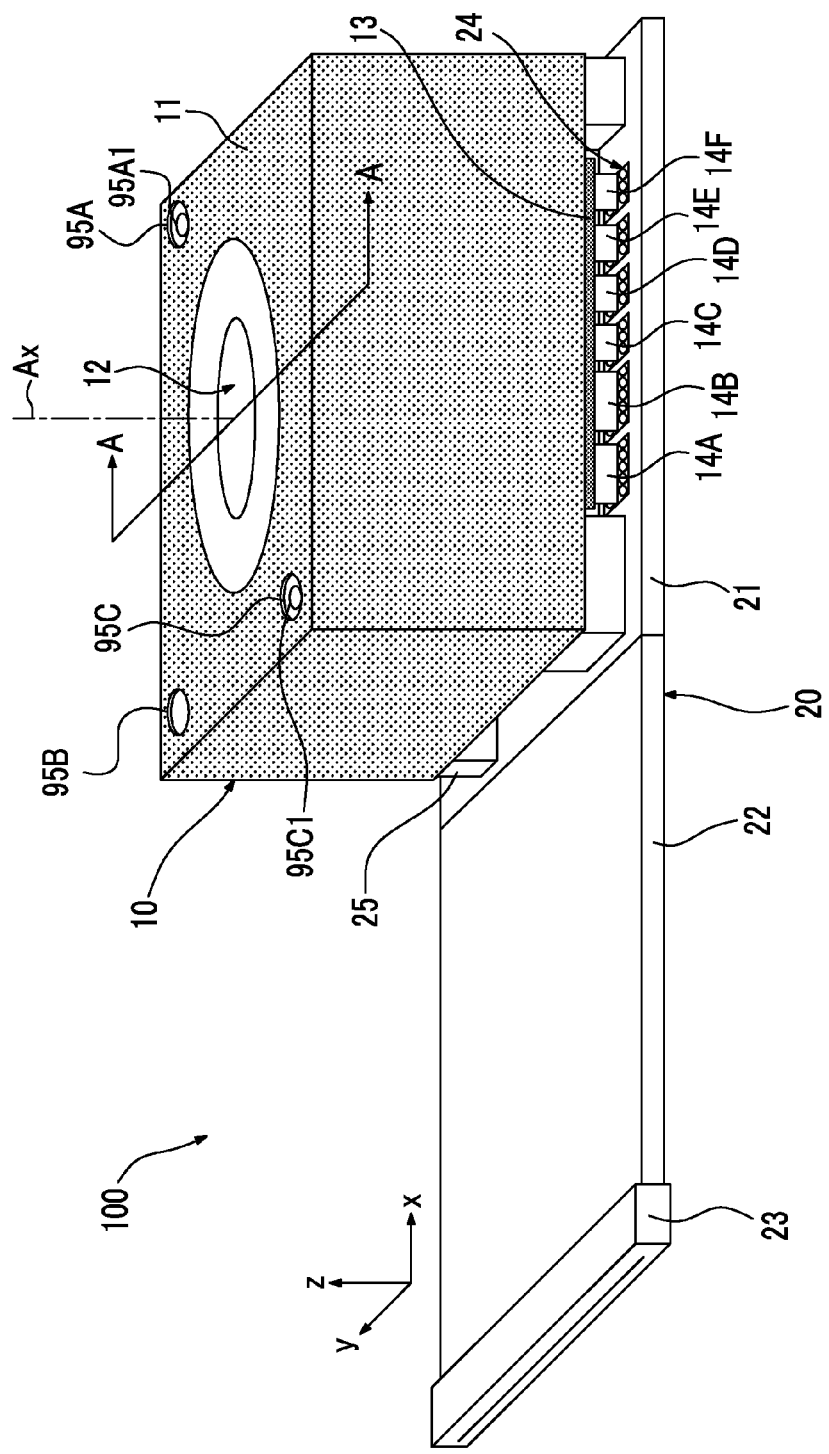
FIG. 1 is an external perspective view of an imaging module 100 according to an embodiment of the present invention.

FIG. 1 is an external perspective view of an imaging module 100 according to an embodiment of the present invention.

The imaging module 100 includes a lens unit 10 which includes a lens group 12, and an imaging element unit 20 which is fixed to the lens unit 10 and includes an imaging element (not shown in FIG. 1) which captures a photographic subject through the lens group 12.

In FIG. 1, a direction along an optical axis Ax of the lens group 12 is defined as a z direction, and two directions which are orthogonal to the z direction and are orthogonal to each other are defined as an x direction and a y direction, respectively.

The lens unit 10 includes a housing 11 in which components described below are accommodated. A portion of a flexible substrate 13 accommodated in the housing 11 is exposed outside the housing 11. A lens unit terminal portion including terminals 14A to 14F which are connection portions for achieving an electric connection is connected to the distal end of the exposed portion of the flexible substrate 13.

In addition, as described below, the lens unit terminal portion includes other terminals in addition to the terminals 14A to 14F. However, in FIG. 1, for simplification, only the terminals 14A to 14F are shown, and other terminals are not shown. In FIG. 1, the terminals of the lens unit terminal portion are arranged in the x direction.

In addition, the entire flexible substrate 13 is accommodated in the housing 11, each terminal of the lens unit terminal portion is connected to the distal end of the flexible substrate 13, and only a portion of each terminal may be exposed outside the housing 11.

An opening is provided on a top plate of the housing 11 and the lens group 12 is exposed from this opening. The imaging module 100 receives light from a photographic subject through the opening and performs imaging.

Moreover, positioning concave sections 95A, 95B, and 95C for holding the lens unit 10 to a manufacturing apparatus when the imaging module 100 is manufactured are formed on the top plate of the housing 11. Concave sections 95A1 and 95C1 which are smaller than the concave sections 95A and 95C are formed on bottom surfaces of the concave sections 95A and 95C which are disposed on a diagonal line on the top plate.

Figure 2:
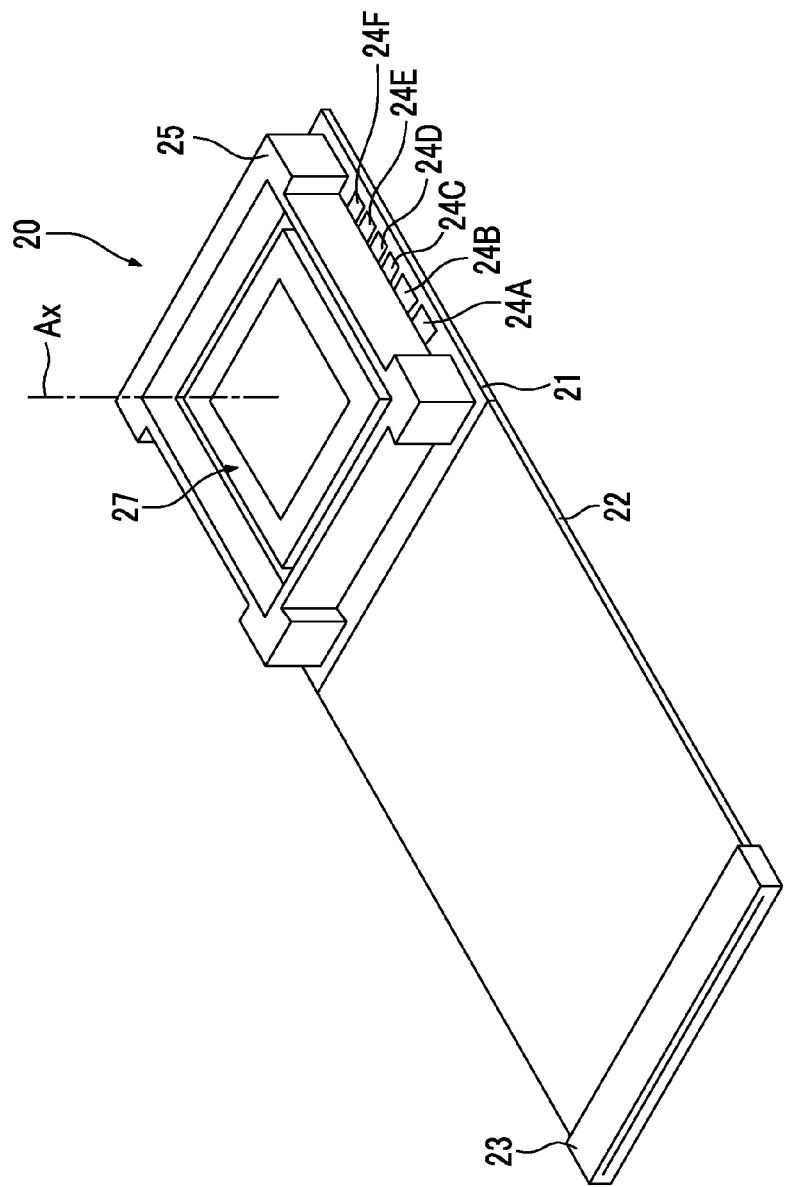
FIG. 2 is an external perspective view of an imaging element unit 20 in a state where a lens unit 10 is omitted in the imaging module 100 shown in FIG. 1.

FIG. 2 is an external perspective view showing a state where the lens unit 10 is omitted in the imaging module 100 shown in FIG. 1.

As shown in FIG. 2, the imaging element unit 20 includes a substrate 21 on which an imaging element 27 such as a CCD image sensor or a CMOS image sensor is formed, and a flexible substrate 22 which is electrically connected to the substrate 21. For example, an imaging element having a pixel pitch of 1.0 µm or less may be used as the imaging element 27.

In recent years, the pixel pitch of the imaging element decreases according to an increase of a pixel number. If the pixel pitch decreases, an area per one pixel decreases. Accordingly, a radius of an allowable circle of confusion decreases, and a focal depth decreases. In addition, since it is necessary to increase a condensed light amount per one pixel, an F-number of the lens is likely to be decreased.

Accordingly, in recent years, since the focal depth of the imaging module is very small, it is necessary to perform positioning of the lens unit and the imaging element unit with high accuracy. Particularly, if the pixel pitch is 1.0 µm or less, high positioning accuracy is required.

In addition, the pixel pitch means the minimum distance among distances between centers of photoelectrically converted regions included in pixels provided in the imaging element.

An outer edge shape of the imaging element 27 is a rectangular shape (is not limited to a complete rectangular shape, and is a substantially a rectangular shape). In a plan view in which the imaging module 100 is viewed from the photographic subject side, among four main sides which configure outer edges of the imaging element 27, two parallel sides are parallel to the x direction, and the remaining two sides are parallel to the y direction.

A tubular cover holder 25 is formed on the substrate 21, and an imaging element 27 is disposed inside the cover holder 25. A cover glass (not shown) is fitted to the upper portion of the imaging element 27 in a hollow portion of the cover holder 25.

An imaging element unit terminal portion including terminals 24A and 24F which are connection portions (fourth connection portions) for electrically connecting to the lens unit 10 are formed on the surface of the substrate 21 on the outside of the cover holder 25. Similarly to the lens unit terminal portion, in the imaging element unit terminal portion, only some terminals are shown. The terminals of the imaging element unit terminal portion are arranged in the x direction in a plan view.

An imaging element wire, which is connected to a data output terminal, a drive terminal, or the like of the imaging element 27, is provided on the substrate 21. The imaging element wire is connected to an external connection terminal portion 23, which is provided on the end portion of the flexible substrate 22, via a wire provided on the flexible substrate 22.

In addition, a lens unit wire, which is connected to each terminal included in the imaging element unit terminal portion, is provided on the substrate 21. The lens unit wire is connected to the external connection terminal portion 23, which is provided on the end portion of the flexible substrate 22, via the wire provided on the flexible substrate 22.

As shown in FIG. 1, in a state where the lens unit 10 and the imaging element unit 20 are fixed, each terminal of the lens unit terminal portion and each terminal of the imaging element unit terminal portion corresponding to each terminal of the lens unit terminal portion are electrically connected to each other. That is, it is possible to drive imaging element unit 20 and the lens unit 10 using the external connection terminal portion 23.

In the state where the lens unit 10 and the imaging element unit 20 are fixed, in the example of FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
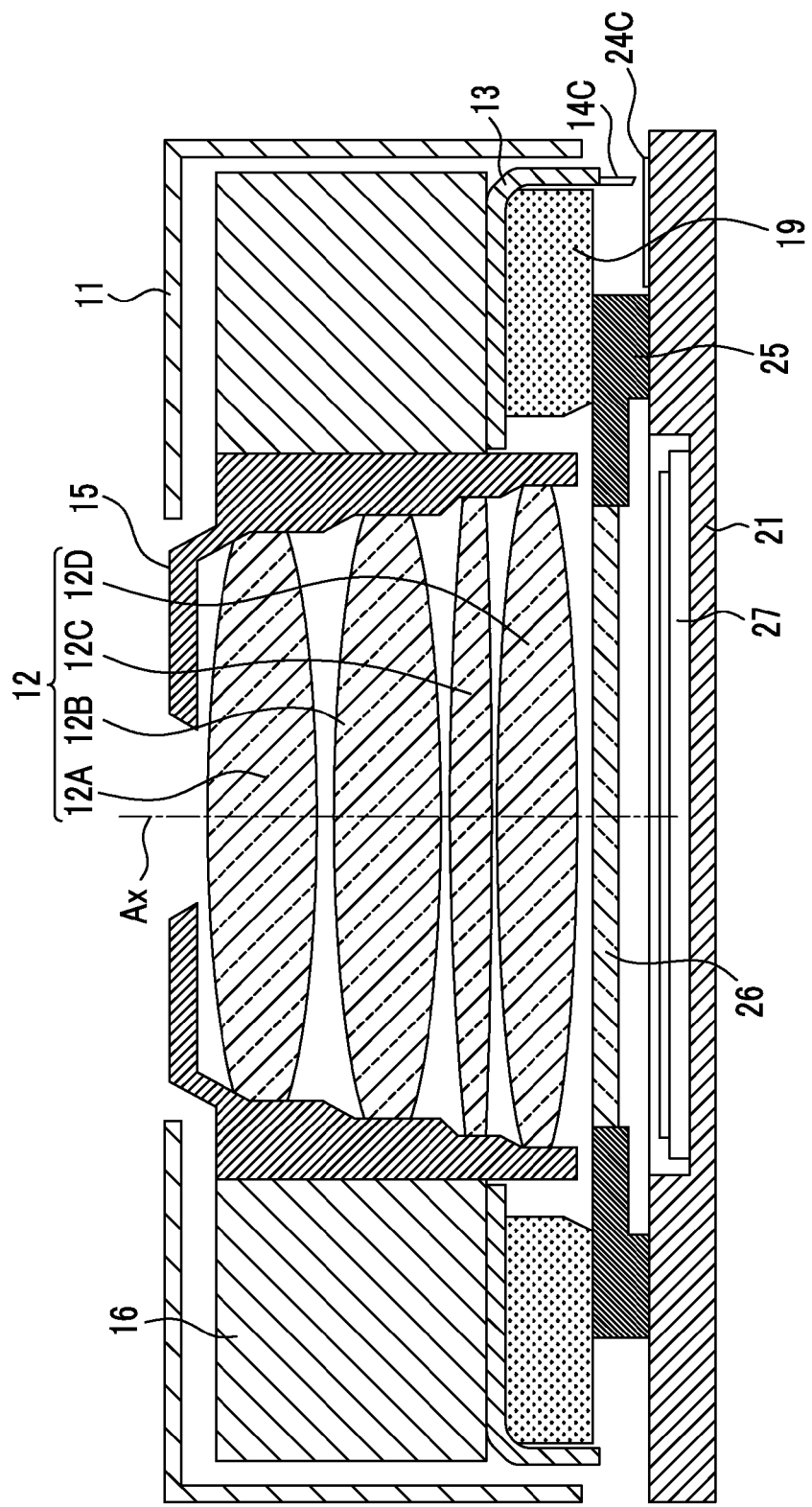
FIG. 3 is a sectional view taken along line A-A of the imaging module 100 shown in FIG. 1.

FIG. 3 is a sectional view taken along line A-A of the imaging module 100 shown in FIG. 1.

As shown in FIG. 3, the imaging element 27 is disposed in a concave section provided on the substrate 21, and is sealed by the cover holder 25 provided on the substrate 21 and a cover glass 26 fitted to the cover holder 25.

In addition, as shown in FIG. 3, the lens unit 10 includes the lens group 12 which includes a plurality of lenses (four lenses 12A to 12D in the example of FIG. 3) disposed above the cover glass 26, a tubular lens barrel 15 which supports the lens group 12, a bottom block 19 which is disposed on the upper surface of the cover holder 25 of the imaging element unit 20, the flexible substrate 13 which is fixed to the bottom block 19, the lens unit terminal portions (only the terminal 14C is shown since FIG. 3 is a sectional view) which are connected to the flexible substrate 13, and a lens drive unit 16 which is formed on the flexible substrate 13.

The lens group 12, the lens barrel 15, the bottom block 19, the flexible substrate 13, and the lens drive unit 16 are accommodated in the housing 11.

The lens drive unit 16 includes a first lens driving unit, a second lens driving unit, a third lens driving unit, and a hall element which is a position detection element for detecting the position of the lens.

The first lens driving unit is a driving unit which moves at least a portion (all lenses of the lens group 12 in the example of FIG. 3) of the lenses of the lens group 12 along the optical axis Ax of the lens group 12 so as to perform focus adjustment.

The second lens driving unit and the third lens driving unit are driving units which respectively move at least a portion (all lenses of the lens group 12 in the example of FIG. 3) of the lenses of the lens group 12 in a second direction (x direction in FIG. 1) and a third direction (y direction in FIG. 1) orthogonal to the optical axis Ax of the lens group 12 so as to correct blur of an image captured by the imaging element 27.

Each of the first lens driving unit, the second lens driving unit, and the third lens driving unit is an actuator for moving the lens, and in the present embodiment, is configured of a voice coil motor (VCM). However, each lens driving unit may adopt other known means.

Figure 4:
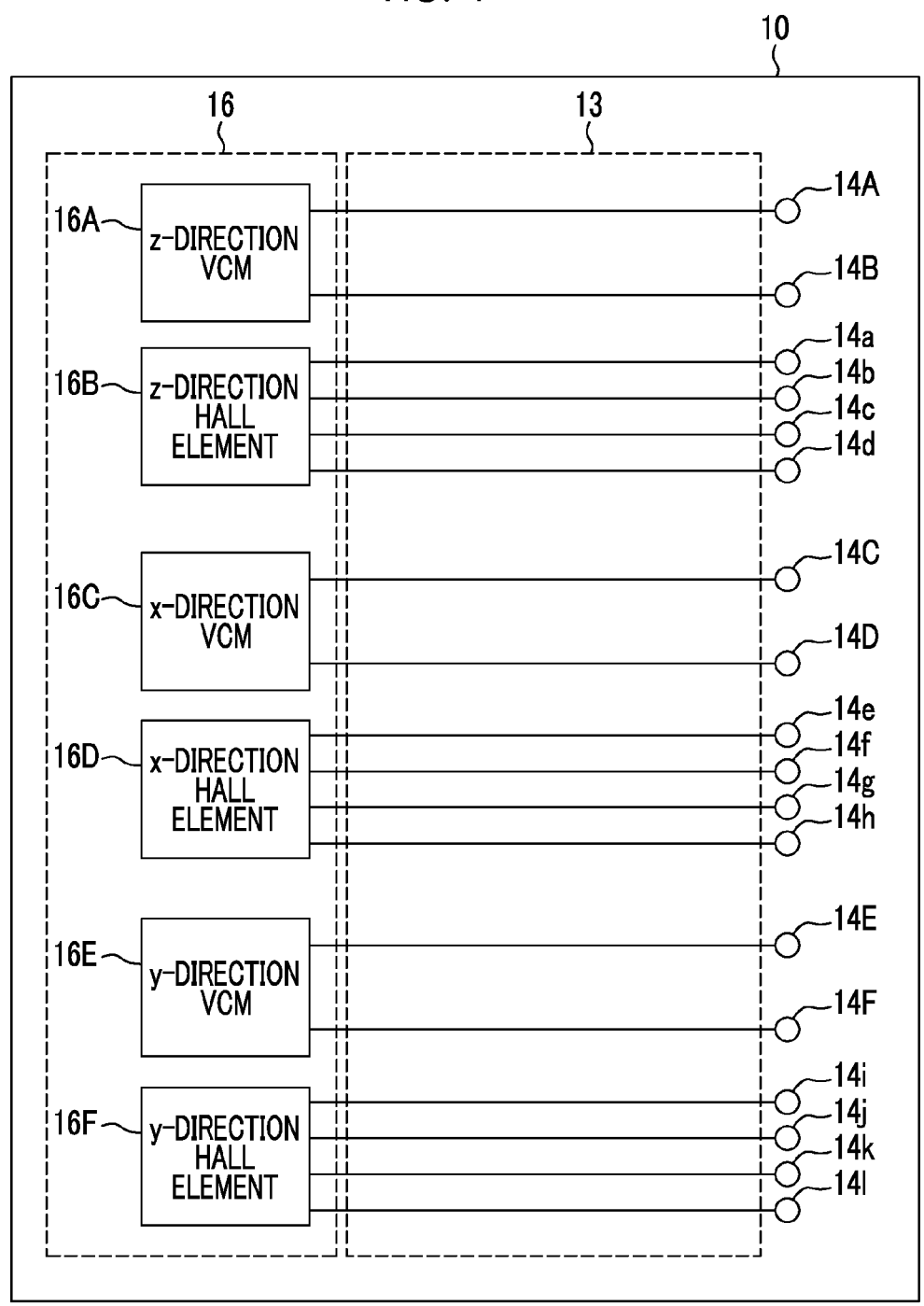
FIG. 4 is a view showing an electric connection configuration inside the lens unit 10 shown in FIG. 2.

FIG. 4 is a block diagram showing an electric connection configuration of the lens unit 10 shown in FIG. 1.

As shown in FIG. 4, the lens drive unit 16 includes a z-direction VCM 16A (the first lens driving unit) for moving the lens group 12 in the z direction, a z-direction hall element 16B for detecting a position of the lens group 12 in the z direction, and an x-direction VCM 16C (the second lens driving unit) for moving the lens group 12 in the x direction. In addition, the lens drive unit 16 includes an x-direction hall element 16D for detecting a position of the lens group 12 in the x direction, and a y-direction VCM 16E (the third lens driving unit) for moving the lens group 12 in the y direction. Moreover, the lens drive unit 16 includes a y-direction hall element 16F for detecting a position of the lens group 12 in the y direction.

Two terminals are formed on the z-direction VCM 16A, and the two terminals are electrically connected to the terminal 14A and the terminal 14B via wires formed on the flexible substrate 13, respectively. That is, each of the terminal 14A and the terminal 14B functions as a first connection portion.

Four terminals are formed on the z-direction hall element 16B, and the four terminals are electrically connected to the terminal 14a, the terminal 14b, the terminal 14c, and the terminal 14d via wires formed on the flexible substrate 13, respectively.

Two terminals are formed on the x-direction VCM 16C, and the two terminals are electrically connected to the terminal 14C and the terminal 14D via wires formed on the flexible substrate 13, respectively. That is, each of the terminal 14C and the terminal 14D functions as a second connection portion.

Four terminals are formed on the x-direction hall element 16D, and the four terminals are electrically connected to the terminal 14e, the terminal 14f, the terminal 14g, and the terminal 14h via wires formed on the flexible substrate 13, respectively.

Two terminals are formed on the y-direction VCM 16E, and the two terminals are electrically connected to the terminal 14E and the terminal 14F via wires formed on the flexible substrate 13, respectively. That is, each of the terminal 14E and the terminal 14F functions as a third connection portion.

Four terminals are formed on the y-direction hall element 16F, and the four terminals are electrically connected to the terminal 14i, the terminal 14j, the terminal 14k, and the terminal 14l via wires formed on the flexible substrate 13, respectively.

The terminals 14A to 14F and the terminals 14a to 14l configure the lens unit terminal portion.

In addition, the required number of terminals with respect to each lens driving unit and each hall element is an example, and is not limited to the above-described number.

In a manufacturing process of the imaging module 100 configured as described above, first, the lens unit 10 and the imaging element unit 20 are separately manufactured. In addition, an adjustment process for positioning the lens unit 10 and the imaging element unit 20 is performed so that an image forming surface of the photographic subject formed by the lens group 12 and an imaging surface of the imaging element 27 are coincident with each other, and thereafter, the lens unit 10 and the imaging element unit 20 are bonded and fixed to each other.

In the adjustment process, by moving the imaging element unit 20 in a state where a predetermined state of the lens unit 10 is held by a manufacturing apparatus, the positioning of the lens unit 10 and the imaging element unit 20 is performed. In this case, in the lens unit 10, a state where the z direction (the direction of the optical axis Ax) shown in FIG. 1 is parallel to the gravity direction is held.

Here, the state of the lens unit 10 in which the z direction is parallel to the gravity direction may be a state of an extent in which the lens group 12 does not move in the x direction and the y direction due to influences of gravity, and the z direction and the gravity direction do not necessarily need to be strictly perpendicular to each other. If the lens group 12 is positioned within a range in which the lens group 12 is not moved in the x direction and the y direction, inclination of the lens unit 10 due to mechanical loss, friction resistance, or the like is allowed.

In the imaging module 100, the lens group 12 can move in the z direction by the first lens driving unit (z-direction VCM 16A). Accordingly, when the state of the lens unit 10 where the z direction shown in FIG. 1 is parallel to the gravity direction is held, since the position of the lens group 12 is affected by gravity, it is assumed that the position of the lens group 12 is deviated in the z direction from a reference position for the positioning.

Therefore, in the adjustment process, communication probe pins come into contact with exposed surfaces of the terminals 14A and 14B which are exposed outside the housing 11, electricity flows to the terminals 14A and 14B, the first lens driving unit is driven, and the position in the z direction of the lens group 12 is held at the reference position.

In addition, in this state, the positioning of the lens unit 10 and the imaging element unit 20 is performed. Accordingly, in all imaging modules 100 which are manufactured, the positioning can be performed under the same conditions, and it is possible to perform the adjustment with high accuracy.

In the imaging module 100, in order to easily perform the contact of the probe pins with respect to the exposed surfaces of the terminals 14A and 14B, among all terminals included in the lens unit terminal portion, exposed areas of the terminals 14A and 14B are larger than exposed areas of terminals (terminals 14C to 14F and terminals 14a to 14l) except for the terminals 14A and 14B.

As shown in FIG. 1, an arrangement direction of the terminals 14A to 14F is the x direction, and lengths in the z direction on the exposed surfaces of the terminals 14A to 14F are the same as each other. In addition, by allowing lengths in the x direction on the exposed surfaces of the terminals 14A and 14B (first area) to be larger than lengths in the x direction on the exposed surfaces of the terminals 14C to 14F (second area), the exposed areas of the terminals 14A and 14B are larger than the exposed areas of the terminals 14C to 14F. For example, preferably, each of the lengths in the x direction on the exposed surfaces of the terminals 14A and 14B is 1.1 times or more each of the lengths in the x direction on the exposed surfaces of the terminals 14C to 14F.

If the exposed areas of the terminals 14A and 14B are small, it is necessary to perform the positioning of the probe pin with respect to the exposed areas of the terminals 14A and 14B with high accuracy, and a cost of the manufacturing apparatus increases.

According to the imaging module 100, since the exposed areas of the terminals 14A and 14B are large, it is not necessary to perform the positioning of the probe pin with respect to the exposed areas of the terminals 14A and 14B with high accuracy, and it is possible to prevent the cost of the manufacturing apparatus from increasing. As a result, it is possible to reduce the manufacturing cost of the imaging module 100. The upper limit of each of the exposed areas of the terminals 14A and 14B may be freely determined according to design such as the size of the imaging module.

Figure 5:
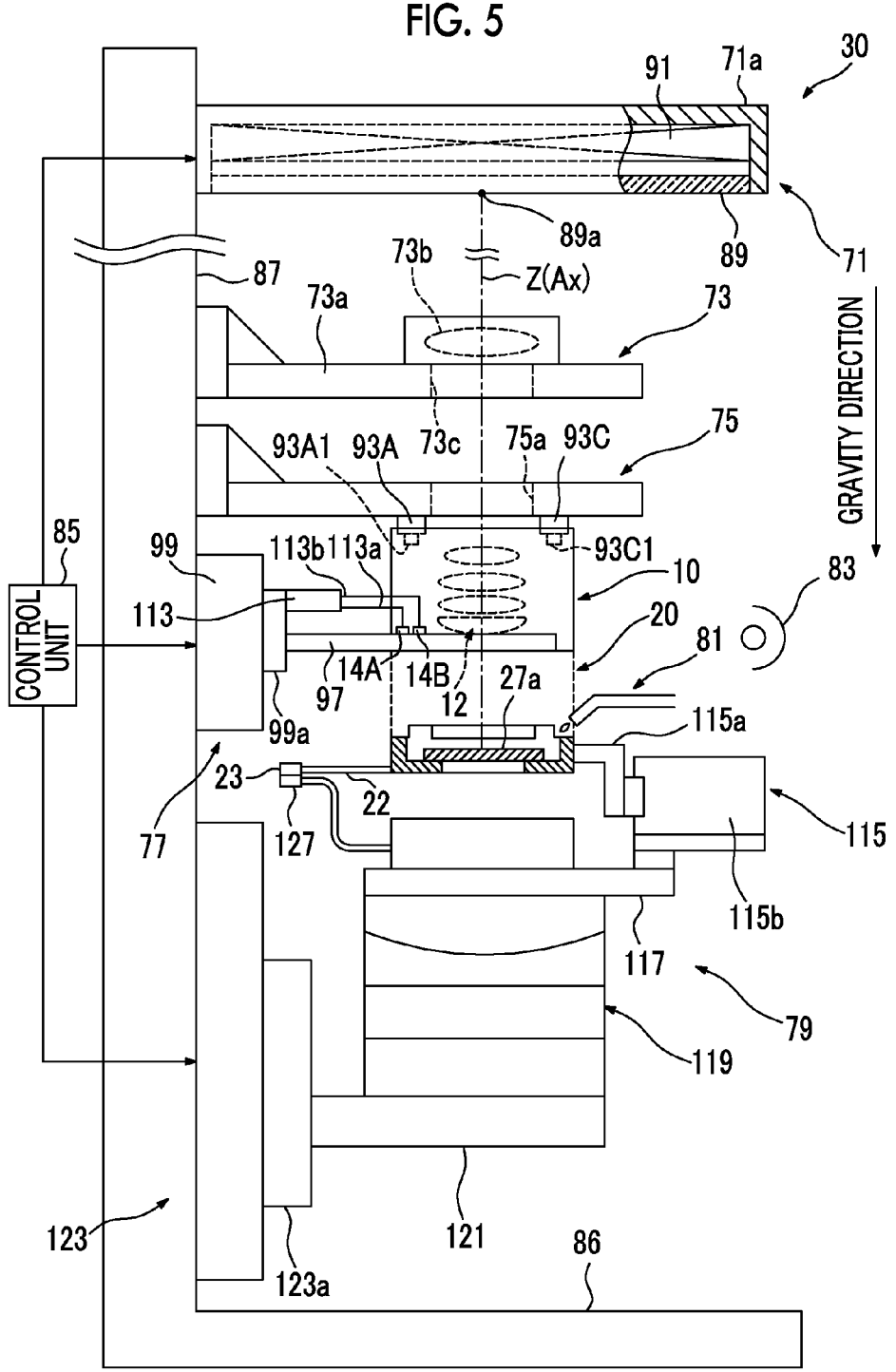
FIG. 5 is a side view showing a schematic configuration of a manufacturing apparatus 30 of the imaging module 100.

FIG. 5 is a side view showing a schematic configuration of a manufacturing apparatus 30 of the imaging module 100.

The imaging module manufacturing apparatus 30 adjusts the position of the imaging element unit 20 with respect to the lens unit 10, and the imaging module 100 is completed by fixing the imaging element unit 20 to the lens unit 10 after the adjustment.

The imaging module manufacturing apparatus 30 includes a chart unit 71, a collimator unit 73, a lens positioning plate 75, a lens holding mechanism 77, an element movement mechanism 79, an adhesive supply portion 81, an ultraviolet lamp 83, and a control unit 85 which controls the above-described components. The components except for the control unit 85 are fixed to a surface 87 of a common workbench 86 parallel to the gravity direction.

The chart unit 71 is configured of a box-shaped housing 71a, a measurement chart 89 which is fitted into the housing 71a, and a light source 91 which is incorporated into the housing 71a and illuminates the measurement chart 89 from the rear surface of the measurement chart 89 with parallel light. For example, the measurement chart 89 is formed of a plastic plate having light diffusibility.

The collimator unit 73 is disposed to face the chart unit 71 on a Z axis which is a perpendicular line with respect to a chart surface (a surface perpendicular to the surface 87 of the workbench 86) of the measurement chart 89 and is a line passing through a chart surface center 89a.

The collimator unit 73 is configured of a bracket 73a which is fixed to the surface 87 of the workbench 86 and a collimator lens 73b. The collimator lens 73b has a function which collects light radiated from the chart unit 71 and positions a virtual image position of the measurement chart 89 with respect to the lens unit 10 at an arbitrary distance (for example, an infinity position or a standard photographic subject distance suitable for assumed photographing of the lens unit 10).

For example, the lens positioning plate 75 is formed of a metal so as to have stiffness, and includes an opening portion 75a through which a light beam transmitting the collimator unit 73 passes.

Figure 6:
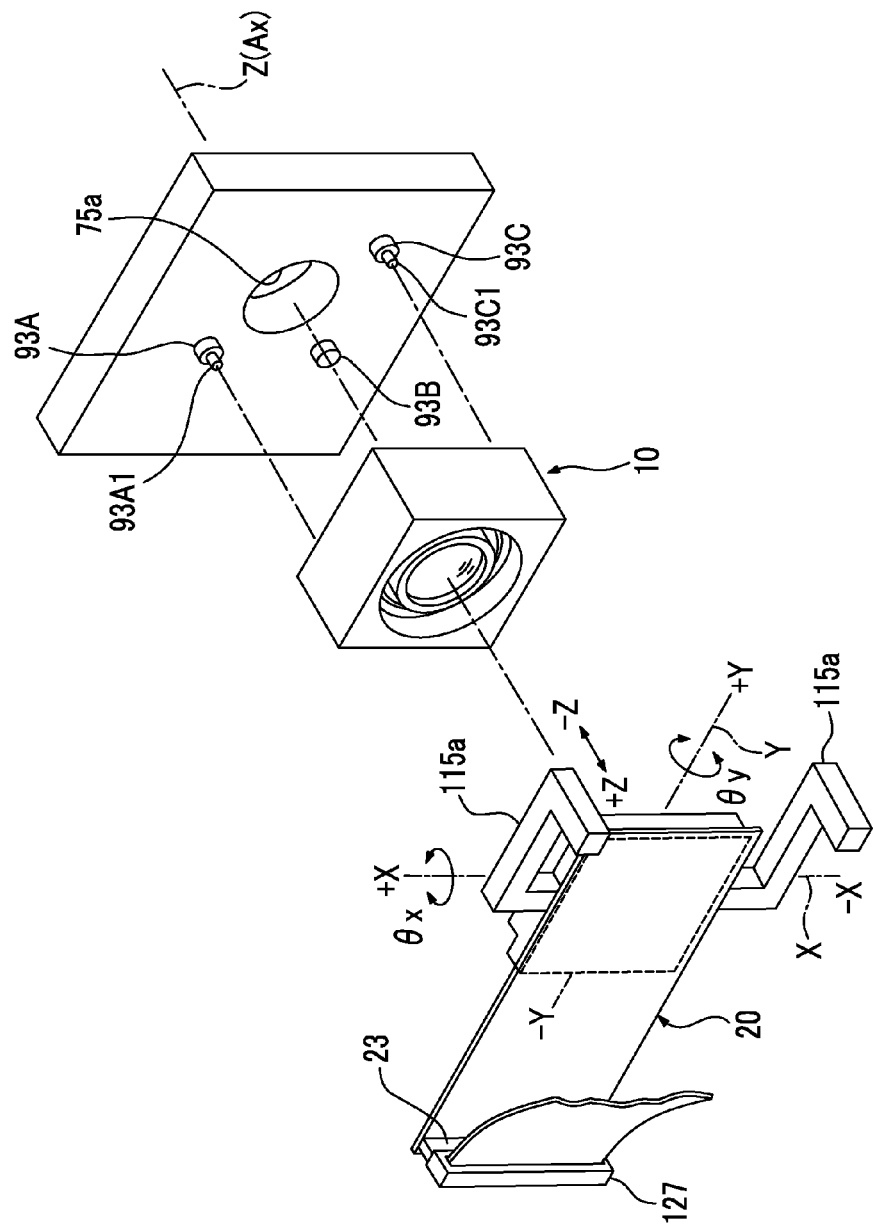
FIG. 6 is an explanatory view showing a state where the lens unit 10 and the imaging element unit 20 are held by the imaging module manufacturing apparatus 30.

FIG. 6 is an explanatory view showing a state where the lens unit 10 and the imaging element unit 20 are held by the imaging module manufacturing apparatus 30.

As shown in FIG. 6, three abutment pins 93A, 93B, and 93C are provided around the opening portion 75a on the surface of the lens holding mechanism 77 side of the lens positioning plate 75.

Among the three abutment pins 93A, 93B, and 93C, insertion pins 93A1 and 93C1 having smaller diameters than those of the abutment pins are provided on the distal ends of two abutment pins 93A and 93C which are positioned on a diagonal line.

The abutment pins 93A, 93B, and 93C are received by the concave sections 95A, 95B, and 95C of the lens unit 10 shown in FIG. 1, the insertion pins 93A1 and 93C1 are inserted into the concave sections 95A1 and 95C1, and the positioning of the lens unit 10 is performed.

In this way, in the state where the lens unit 10 is positioned, the Z axis is coincident with the optical axis Ax of the lens unit 10. That is, the optical axis Ax of the lens unit 10 is parallel to the gravity direction.

The lens holding mechanism 77 is configured of a holding plate 97 which holds the lens unit 10 so that the top plate of the housing 11 faces the chart unit 71 on the Z axis, and a first slide stage 99 which moves the holding plate 97 in the Z axis direction.

The first slide stage 99 is an electric precision stage. In the first slide stage, a ball screw is rotated by rotation of a motor (not shown), and a stage portion 99a which engages with the ball screw moves in the Z axis direction.

The holding plate 97 moves in the Z axis direction, the holding plate 97 is pressed to the bottom block 19 of the lens unit 10 positioned by the lens positioning plate 75, and the lens unit 10 is held by the manufacturing apparatus 30.

A probe unit 113 including two probe pins 113a and 113b is attached to the stage portion 99a so as to face the holding plate 97.

The probe pin 113a comes into contact with the terminal 14A of the lens unit 10 and the probe pin 113b comes into contact with the terminal 14B of the lens unit 10. Accordingly, the probe unit 113 is electrically connected to the above-described first lens driving unit.

Electricity flows to the probe pins 113a and 113b by the probe unit 113, and the position in the optical axis Ax direction of the lens group 12 of the lens unit 10 is held at a predetermined position (for example, an infinite distance end or a closest end).

The element movement mechanism 79 is configured of a chuck hand 115, a biaxial rotation stage 119, and a second slide stage 123. The chuck hand 115 holds the imaging element unit 20 so that the imaging surface 27a faces the chart unit 71 on the Z axis. The biaxial rotation stage 119 holds an approximately crank-shaped bracket 117 to which the chuck hand 115 is attached, and adjusts inclination of the imaging element unit 20 around two axes (horizontal X axis and vertical Y axis) orthogonal to the Z axis. The second slide stage 123 holds a bracket 121 to which the biaxial rotation stage 119 is attached, and moves the bracket 121 in the Z axis direction.

As shown in FIG. 6, the chuck hand 115 is configured of a pair of clamping members 115a which is bent in an approximately crank shape, and an actuator 115b (refer to FIG. 5) which moves the clamping members 115a in the X axis direction orthogonal to the Z axis. The clamping members 115a are inserted into an outer frame of the imaging element unit 20, and the imaging element unit 20 is held.

In addition, the chuck hand 115 positions the imaging element unit 20 which is interposed by the clamping members 115a so that the optical axis Ax of the lens unit 10 and a center position of the imaging surface 27a are substantially coincident with each other. In addition, when viewed from the Z axis direction, the chuck hand 115 positions the imaging element unit 20 which is interposed by the clamping members 115a so that each terminal of the imaging element unit terminal portion of the imaging element unit 20 overlaps each terminal of the lens unit terminal portion of the lens unit 10.

The biaxial rotation stage 119 is an electric twin-axis goino stage, and inclines the imaging element unit 20 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 20 is inclined in each direction, a positional relationship between the center position of the imaging surface 27a and the Z axis is not misaligned.

The second slide stage 123 is an electric precision stage. In the second slide stage, a ball screw is rotated by rotation of a motor (not shown), and a stage portion 123a which engages with the ball screw moves in the Z axis direction. The bracket 121 is fixed to the stage portion 123a.

A connection cable 127, which is connected to the external connection terminal portion 23 provided on the distal end of the flexible substrate 22 of the imaging element unit 20, is attached to the biaxial rotation stage 119. Drive signals are input to the imaging element 27 through the connection cable 127, or captured image signals output from the imaging element 27 are output through the connection cable 127.

After the positional adjustment of the lens unit 10 and the imaging element unit 20 ends, the adhesive supply portion 81 supplies an ultraviolet curing type adhesive to a gap between the lens unit 10 and the imaging element unit 20.

The ultraviolet lamp 83 irradiates the ultraviolet curing type adhesive supplied to the gap with ultraviolet rays, and the adhesive is cured. Moreover, as the adhesive, in addition to the ultraviolet curing type adhesive, an instantaneous adhesive, a thermosetting adhesive, a natural curing adhesive, or the like may be used.

In the imaging module manufacturing apparatus 30, the lens unit 10 is held by a holding plate 97 in the state where the z direction shown in FIG. 1 is parallel to the gravity direction. In the state where the lens unit 10 is held by the holding plate 97, the probe pins 113a and 113b of the probe unit 113 come into contact with the terminals 14A and 14B of the lens unit 10.

Accordingly, the first lens driving unit in the lens unit 10 can be driven, and the control unit 85 controls the position in the optical axis Ax direction of the lens group 12 such that the position reaches a predetermined reference position, via the probe unit 113.

In addition, after the imaging element unit 20 interposed between the clamping members 115a is positioned so that the optical axis Ax of the lens unit 10 and the center position of the imaging surface 27a are coincident with each other, the position in the Z axis direction of the imaging element unit 20 is changed, and the position in the Z axis direction of the imaging element unit 20, and angles in the θx direction and the θy direction of the imaging element unit 20 are respectively adjusted based on captured image signals obtained by capturing the measurement chart 89 at each position using the imaging element 27. In addition, the adjustment with respect to the angles in the θx direction and the θy direction of the imaging element unit 20 may be omitted.

After this adjustment is performed, an ultraviolet curing type adhesive is supplied from the adhesive supply portion 81 to the gap between the lens unit 10 and the imaging element unit 20, and the ultraviolet curing type adhesive is cured by turning on the ultraviolet lamp 83.

The adhesive is cured, the completed imaging module 100 is discharged from the imaging module manufacturing apparatus 30.

In addition, the lens unit 10 and the imaging element unit 20 are fixed by the ultraviolet curing type adhesive. However, the curing of the ultraviolet curing type adhesive is used for temporary fixation between the lens unit 10 and the imaging element unit 20.

For example, in a state where the lens unit 10 and the imaging element unit 20 are temporarily fixed to each other, the lens unit 10 and the imaging element unit 20 are discharged from the imaging module manufacturing apparatus 30, a desired process such as cleaning processing is performed, and thereafter, the lens unit 10 and the imaging element unit 20 are completely fixed to each other by a thermosetting type adhesive or the like, and the imaging module 100 may be manufactured.

Since the imaging module 100 is manufactured by the above-described manufacturing apparatus 30, it is possible to perform the positioning of the lens unit 10 and the imaging element unit 20 with high accuracy.

As the imaging element 27, when an imaging element having a small pixel size in which a pixel pitch is 1.0 µm or less is used, as described above, particularly, the positioning accuracy of the lens unit and the imaging element unit is required. Even in this case, according to a combination of the configuration of the lens unit 10 and the manufacturing process using the manufacturing apparatus 30, it is possible to perform the positioning of the lens unit 10 and the imaging element unit 20 at a low cost and with high accuracy.

Next, modification examples of the imaging module 100 will be described.

First Modification Example

Figure 7:
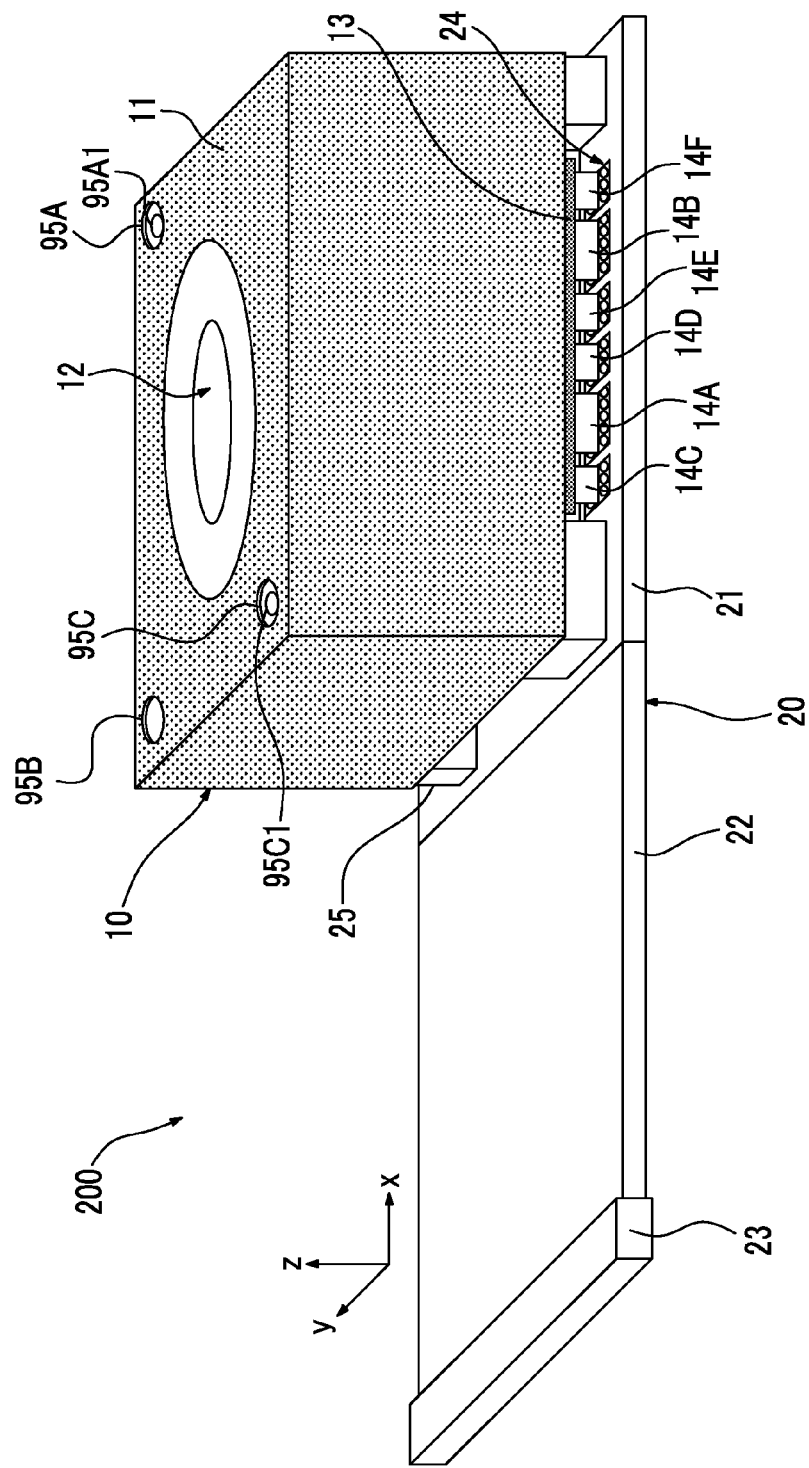
FIG. 7 is an external perspective view of an imaging module 200 which is a modification example of the imaging module 100.

FIG. 7 is an external perspective view of an imaging module 200 which is a modification example of the imaging module 100.

The imaging module 200 has the same configuration as the imaging module 100 except that the positions of the terminals 14A and 14B of the lens unit 10 are changed.

In the imaging module 100, in the arrangement direction (x direction) of the terminals 14A to 14F, other terminals do not exist between the terminal 14A and the terminal 14B having a large exposed area. Meanwhile, in the imaging module 200, other terminals to which electricity does not flow during the adjustment process exist between the terminal 14A and the terminal 14B and are arranged therebetween.

According to this arrangement, it is possible to increase the distance between the terminals which come into contact with the probe pins during the adjustment process. Accordingly, an electrical connection between the probe unit 113 and the terminals 14A and 14B is more easily performed, and it is possible to reduce a cost of the manufacturing apparatus. As a result, it is possible to reduce the manufacturing cost of the imaging module 200.

Second Modification Example

Figure 8:
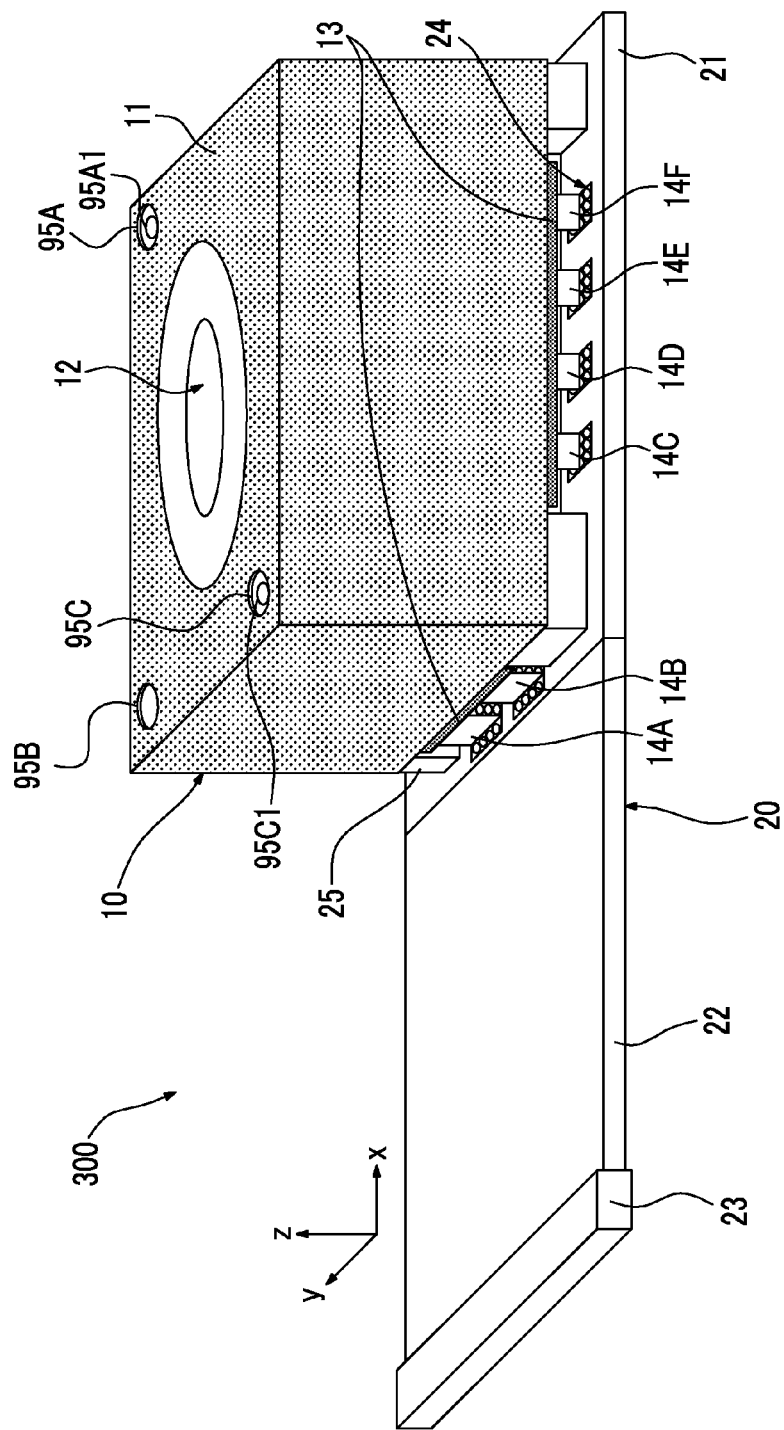
FIG. 8 is an external perspective view of an imaging module 300 which is a modification example of the imaging module 100.

FIG. 8 is an external perspective view of an imaging module 300 which is a modification example of the imaging module 100.

In the imaging module 100, the terminal 14A to the terminal 14F are arranged in the direction along one side of outer edges of the imaging element 27 in a plan view. Meanwhile, the imaging module 300 is different from the imaging module 100 in that the terminal 14A to the terminal 14F are arranged in directions along two sides different from each other (in the example of FIG. 8, the side parallel to the x direction and the side parallel to the y direction in a plan view) of the outer edges of the imaging element 27 in a plan view.

Moreover, in the imaging module 300, the dispositions of the terminals 24A to 24F provided on the substrate 21 are changed according to the changes of the dispositions of the terminal 14A to the terminal 14F.

Among the terminals included in the lens unit terminal portion of the imaging module 300, the terminals 14A and 14B are arranged in the direction along the side parallel to the y direction of the imaging element 27, and the remaining terminals are arranged in the direction along the side parallel to the x direction of the imaging element 27.

Since the length of one side of the imaging element 27 is not limited, among the terminals included in the lens unit terminal portion, the terminals 14A and 14B having large exposed areas and the remaining terminals having small exposed areas are arranged in the directions along the sides different from each other of the imaging element 27 in a plan view, and it is possible to increase the exposed areas of the terminals 14A and 14B. Accordingly, probing is easily performed, and it is possible to reduce the manufacturing cost of the imaging module 300.

Third Modification Embodiment

In the manufacturing processes of the imaging module 100 and the imaging module 300, it is possible to perform the positioning having high accuracy by driving the first lens driving unit included in the lens unit 10. In order to increase the accuracy, the positioning may be performed in a state where electricity flows to the z-direction hall element 16B included in the lens drive unit 16.

That is, probes, which come into contact with the four terminals 14a to 14d connected to the z-direction hall element 16B, may be provided on the probe unit 113 of the manufacturing apparatus 30.

In addition, in the adjustment process, in a state where electricity flows to the terminals 14A and 14B and the terminals 14a to 14d and the position in the z direction of the lens group 12 is held with high accuracy using the signals detected by the z-direction hall element 16B, the control unit 85 may perform the imaging of the measurement chart 89.

In this way, it is possible to control the position in the optical axis Ax direction of the lens group 12 with high accuracy. In this case, by causing the exposed areas of the four terminals 14a to 14d to be larger than the exposed area of the terminal to which electricity does not flow during the adjustment process, it is possible to reduce the manufacturing cost.

Moreover, in this case, the exposed areas of the six terminals electrically connected to the first lens driving unit increase. However, if the terminal to which electricity does not flow during the adjustment process is provided at least one location between the six terminals, it is possible to increase the distance between terminals to which electricity is to be applied. Accordingly, it is possible to easily perform probing.

In addition, if a portion of the six terminals and the remaining terminals are arranged in directions along sides different from each other of the imaging element 27 in a plan view, it is possible to further increase the areas of the six terminals. Accordingly, it is possible to easily perform probing.

Hereinbefore, the aspects are described in which the exposed areas of all terminals to which electricity flows during the adjustment process are larger than the exposed areas of the terminals to which electricity does not flow during the adjustment process. However, when the exposed area of at least one of all terminals to which electricity flows during the adjustment process is larger than the exposed area to which electricity does not flow during the adjustment process, since probing is easily performed, it is possible to obtain a reduction effect of the manufacturing cost.

For example, in the imaging module 100 in FIG. 1, even when the exposed area of any one of the terminal 14A and the terminal 14B is the same configuration as the exposed area of the terminal 14C, it is possible to easily perform probing.

Fourth Modification Embodiment

Hereinbefore, the aspects are described, in which differences of the exposed areas of the plurality of terminals configuring the lens unit terminal portion connected to the flexible substrate 13 of the lens unit 10 are obtained by changing the lengths in the arrangement direction of the plurality of terminals on the exposed surfaces of the plurality of terminals. However, the differences of the exposed areas of the plurality of terminals may be obtained by changing the lengths in the direction orthogonal to the arrangement direction of the plurality of terminals on the exposed surfaces of the plurality of terminals.

FIG. 9 is an external perspective view of an imaging module 100A which is a modification example of the imaging module 100 shown in FIG. 1.

In the imaging module 100A, unlike the imaging module 100, the lengths in the x direction on the exposed surfaces of the terminals 14A to 14F are the same as each other, and the lengths in the z direction on the exposed surfaces of the terminals 14A and 14B are longer than the lengths in the z direction on the exposed surfaces of the terminals 14C to 14F. For example, preferably, the lengths in the z direction on the exposed surfaces of the terminals 14A and 14B are 1.1 times or more the lengths in the z direction on the exposed surfaces of the terminals 14C to 14F.

In this way, according to the configuration in which the exposed areas of the terminal are increased by changing the lengths in the direction orthogonal to the arrangement direction of the terminals 14A to 14F on the exposed surfaces of the terminals, even when the number of the terminals provided in the lens unit 10 is large, it is possible to sufficiently secure the exposed areas. It is possible to freely determine the upper limit of each of the exposed areas of the terminals 14A and 14B according to the design of the size of the imaging module or the like.

In addition, the exposed areas of the terminals may be increased by increasing both the lengths in the x direction and the lengths in the z direction on the exposed surfaces of the terminals. For example, preferably, the length in the x direction and the length in the z direction on each of the exposed surfaces of the terminals 14A and 14B are 1.1 times or more the length in the x direction and the length in the z direction of each of the exposed surfaces of the terminals 14C to 14F, and the exposed area of each of the terminals 14A and 14B is 1.4 times or more the exposed area of each of the terminals 14C to 14F. It is possible to freely determine the upper limit of each of the exposed areas of the terminals 14A and 14B according to the design of the size of the imaging module or the like.

As described above, the following matters are disclosed in the present specification.

The disclosed imaging module includes a lens unit which includes a lens group, and an imaging element unit which is fixed to the lens unit and includes an imaging element which captures a photographic subject through the lens group. The lens unit includes a first lens driving unit which moves at least a portion of lenses of the lens group along an optical axis of the lens group, a plurality of first connection portions which are electrically connected to the first lens driving unit, a second lens driving unit and a third lens driving unit which move at least a portion of the lenses in a second direction and a third direction orthogonal to the optical axis of the lens group, respectively, a plurality of second connection portions which are electrically connected to the second lens driving unit, a plurality of third connection portions which are electrically connected to the third lens driving unit, and a housing in which at least the first lens driving unit, the second lens driving unit, and the third lens driving unit are accommodated. The imaging element unit includes a fourth connection portion which is electrically connected to each of the plurality of first connection portions, the plurality of second connection portions, and the plurality of third connection portions. Each connection portion of the plurality of first connection portions, the plurality of second connection portions, and the plurality of third connection portions includes an exposed surface which is exposed outside the housing. Each of the plurality of first connection portions, the plurality of second connection portions, and the plurality of third connection portions has a connection portion in which the exposed surface has a first area, and a connection portion in which the exposed surface has a second area which is larger than the first area. The exposed surface of at least one connection portion of the plurality of first connection portions has the second area. The exposed surface of each connection portion of the plurality of second connection portions and the plurality of third connection portions has the first area.

In the disclosed imaging module, the plurality of first connection portions, the plurality of second connection portions, and the plurality of third connection portions may be arranged in a direction along a side of the imaging element in a plan view when viewed from the photographic subject side. A length of the connection portion in an arrangement direction of the plurality of first connection portions, the plurality of second connection portions, and the plurality of third connection portions on the exposed surface of the connection portion in which the exposed surface has the second area may be longer than a length of the connection portion in the arrangement direction on the exposed surface of the connection portion in which the exposed surface has the first area. The connection portion in which the exposed surface has the second area and the connection portion in which the exposed surface has the first area may be arranged in directions along sides from each other of the imaging element in the plan view.

In the disclosed imaging module, the plurality of first connection portions, the plurality of second connection portions, and the plurality of third connection portions may be arranged in a direction along a side of the imaging element in a plan view when viewed from the photographic subject side. A length of the connection portion in an arrangement direction of the plurality of first connection portions, the plurality of second connection portions, and the plurality of third connection portions on the exposed surface of the connection portion in which the exposed surface has the second area may be longer than a length of the connection portion in the arrangement direction on the exposed surface of the connection portion in which the exposed surface has the first area. The plurality of first connection portions may include a plurality of connection portions in which the exposed surfaces have the second areas, and a portion of the plurality of connection portions in which the exposed surfaces have the second areas, and remaining connection portions except for the portion of the plurality of connection portions may be arranged in directions along sides different from each other of the imaging element in the plan view.

In the disclosed imaging module, the plurality of first connection portions may include a plurality of connection portions in which the exposed surfaces have the second areas, and a connection portion, in which the exposed surface has the first area, may be disposed in at least one location between the plurality of connection portions in which the exposed surfaces have the second areas.

In the disclosed imaging module, a connection portion, in which the exposed surface has the first area, may be disposed in at least one location between the plurality of connection portions which are arranged in the arrangement direction and in which the exposed surfaces have the second areas.

In the disclosed imaging module, the plurality of first connection portions, the plurality of second connection portions, and the plurality of third connection portions may be arranged in a direction along a side of the imaging element in a plan view when viewed from the photographic subject side. A length of the connection portion in a direction orthogonal to the arrangement direction of the plurality of first connection portions, the plurality of second connection portions, and the plurality of third connection portions on the exposed surface of the connection portion in which the exposed surface has the second area may be longer than a length of the connection portion in the orthogonal direction on the exposed surface of the connection portion in which the exposed surface has the first area.

In the disclosed imaging module, a pixel pitch of the imaging element may be 1.0 µm or less.

The disclosed electronic device includes the imaging module.

Particularly, the imaging module of the present invention is applied to an electronic device such as a portable phone, a wristwatch type electronic device, a spectacle type electronic device, or the like, and convenience and effectiveness increase.

EXPLANATION OF REFERENCES

100: imaging module
10: lens unit
11: housing
12: lens group
13: flexible substrate
14A, 14B: z-direction VCM drive terminal (first connection portion)
14C, 14D: x-direction VCM drive terminal (second connection portion)
14E, 14F: y-direction VCM drive terminal (third connection portion)
16: lens drive unit
16A: z-direction VCM
16B: z-direction hall element
16C: x-direction VCM
16D: x-direction hall element
16E: y-direction VCM
16F: y-direction hall element
20: imaging element unit
21: substrate
22: flexible substrate
23: external connection terminal
24A to 24F: imaging element unit side terminal (fourth connection portion)
27: imaging element
30: imaging module manufacturing apparatus
Ax: optical axis
z: direction along optical axis
x: direction orthogonal to z direction
y: direction orthogonal to z direction

What is claimed is:

1. An imaging module, comprising:
a lens unit which includes a lens group; and
an imaging element unit which is fixed to the lens unit and includes an imaging element which captures a photographic subject through the lens group,
wherein the lens unit includes
a first lens driving unit which moves at least a portion of lenses of the lens group in a first direction along an optical axis of the lens group,
a plurality of first connection portions which are electrically connected to the first lens driving unit,
a second lens driving unit and a third lens driving unit which move at least a portion of the lenses in a second direction and a third direction orthogonal to the optical axis of the lens group, respectively,
a plurality of second connection portions which are electrically connected to the second lens driving unit,
a plurality of third connection portions which are electrically connected to the third lens driving unit, and
a housing in which at least the first lens driving unit, the second lens driving unit, and the third lens driving unit are accommodated,
wherein the imaging element unit includes a fourth connection portion which is electrically connected to each of the plurality of first connection portions, the plurality of second connection portions, and the plurality of third connection portions,
wherein each connection portion of the plurality of first connection portions, the plurality of second connection portions, and the plurality of third connection portions includes an exposed surface which is exposed outside the housing,
wherein each of the plurality of first connection portions, the plurality of second connection portions, and the plurality of third connection portions has a connection portion in which the exposed surface has a first area, and a connection portion in which the exposed surface has a second area which is larger than the first area,
wherein the exposed surface of at least one connection portion of the plurality of first connection portions has the second area, and
wherein the exposed surface of each connection portion of the plurality of second connection portions and the plurality of third connection portions has the first area.

2. The imaging module according to claim 1,
wherein the plurality of first connection portions, the plurality of second connection portions, and the plurality of third connection portions are arranged in a direction along a side of the imaging element in a plan view when viewed from the photographic subject side,
wherein a length of the connection portion in an arrangement direction of the plurality of first connection portions, the plurality of second connection portions, and the plurality of third connection portions on the exposed surface of the connection portion in which the exposed surface has the second area is longer than a length of the connection portion in the arrangement direction on the exposed surface of the connection portion in which the exposed surface has the first area, and
wherein the connection portion in which the exposed surface has the second area and the connection portion in which the exposed surface has the first area are arranged in directions along sides different from each other of the imaging element in the plan view.

3. The imaging module according to claim 2,
wherein a pixel pitch of the imaging element is 1.0 µm or less.

4. The imaging module according to claim 2,
wherein the plurality of first connection portions, the plurality of second connection portions, and the plurality of third connection portions are arranged in a direction along a side of the imaging element in a plan view when viewed from the photographic subject side, and
wherein a length of the connection portion in a direction orthogonal to the arrangement direction of the plurality of first connection portions, the plurality of second connection portions, and the plurality of third connection portions on the exposed surface of the connection portion in which the exposed surface has the second area is longer than a length of the connection portion in the orthogonal direction on the exposed surface of the connection portion in which the exposed surface has the first area.

5. The imaging module according to claim 4,
wherein a pixel pitch of the imaging element is 1.0 µm or less.

6. The imaging module according to claim 1,
wherein the plurality of first connection portions, the plurality of second connection portions, and the plurality of third connection portions are arranged in a direction along a side of the imaging element in a plan view when viewed from the photographic subject side,
wherein a length of the connection portion in an arrangement direction of the plurality of first connection portions, the plurality of second connection portions, and the plurality of third connection portions on the exposed surface of the connection portion in which the exposed surface has the second area is longer than a length of the connection portion in the arrangement direction on the exposed surface of the connection portion in which the exposed surface has the first area,
wherein the plurality of first connection portions include a plurality of connection portions in which the exposed surface has the second area, and
wherein a portion of the plurality of connection portions in which the exposed surfaces have the second areas, and remaining connection portions except for the portion of the plurality of connection portions are arranged in directions along sides different from each other of the imaging element in the plan view.

7. The imaging module according to claim 6,
wherein a connection portion, in which the exposed surface has the first area, is disposed in at least one location between the plurality of connection portions which are arranged in the arrangement direction and in which the exposed surfaces have the second areas.

8. The imaging module according to claim 7,
wherein the plurality of first connection portions, the plurality of second connection portions, and the plurality of third connection portions are arranged in a direction along a side of the imaging element in a plan view when viewed from the photographic subject side, and
wherein a length of the connection portion in a direction orthogonal to the arrangement direction of the plurality of first connection portions, the plurality of second connection portions, and the plurality of third connection portions on the exposed surface of the connection portion in which the exposed surface has the second area is longer than a length of the connection portion in the orthogonal direction on the exposed surface of the connection portion in which the exposed surface has the first area.

9. The imaging module according to claim 7,
wherein a pixel pitch of the imaging element is 1.0 µm or less.

10. The imaging module according to claim 6,
wherein the plurality of first connection portions, the plurality of second connection portions, and the plurality of third connection portions are arranged in a direction along a side of the imaging element in a plan view when viewed from the photographic subject side, and
wherein a length of the connection portion in a direction orthogonal to the arrangement direction of the plurality of first connection portions, the plurality of second connection portions, and the plurality of third connection portions on the exposed surface of the connection portion in which the exposed surface has the second area is longer than a length of the connection portion in the orthogonal direction on the exposed surface of the connection portion in which the exposed surface has the first area.

11. The imaging module according to claim 10,
wherein a pixel pitch of the imaging element is 1.0 µm or less.

12. The imaging module according to claim 6,
wherein a pixel pitch of the imaging element is 1.0 µm or less.

13. The imaging module according to claim 1,
wherein the plurality of first connection portions include a plurality of connection portions in which the exposed surfaces have the second areas, and
wherein a connection portion, in which the exposed surface has the first area, is disposed in at least one location between the plurality of connection portions in which the exposed surfaces have the second areas.

14. The imaging module according to claim 13,
wherein the plurality of first connection portions, the plurality of second connection portions, and the plurality of third connection portions are arranged in a direction along a side of the imaging element in a plan view when viewed from the photographic subject side, and
wherein a length of the connection portion in a direction orthogonal to the arrangement direction of the plurality of first connection portions, the plurality of second connection portions, and the plurality of third connection portions on the exposed surface of the connection portion in which the exposed surface has the second area is longer than a length of the connection portion in the orthogonal direction on the exposed surface of the connection portion in which the exposed surface has the first area.

15. The imaging module according to claim 14,
wherein a pixel pitch of the imaging element is 1.0 µm or less.

16. The imaging module according to claim 13,
wherein a pixel pitch of the imaging element is 1.0 µm or less.

17. The imaging module according to claim 1,
wherein the plurality of first connection portions, the plurality of second connection portions, and the plurality of third connection portions are arranged in a direction along a side of the imaging element in a plan view when viewed from the photographic subject side, and wherein a length of the connection portion in a direction orthogonal to the arrangement direction of the plurality of first connection portions, the plurality of second connection portions, and the plurality of third connection portions on the exposed surface of the connection portion in which the exposed surface has the second area is longer than a length of the connection portion in the orthogonal direction on the exposed surface of the connection portion in which the exposed surface has the first area.

18. The imaging module according to claim 17,
wherein a pixel pitch of the imaging element is 1.0 µm or less.

19. The imaging module according to claim 1,
wherein a pixel pitch of the imaging element is 1.0 µm or less.

20. An electronic device, comprising the imaging module according to claim 1.

\* \* \* \* \*